United States Patent

Miyake

Patent Number: 6,088,489
Date of Patent: *Jul. 11, 2000

[54] IMAGE DATA RESOLUTION CONVERSION

[75] Inventor: Nobutaka Miyake, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,865

[22] Filed: Oct. 13, 1995

[30] Foreign Application Priority Data

Oct. 18, 1994 [JP] Japan .................................. 6-252113

[51] Int. Cl.$^7$ ...................................................... G06K 9/32
[52] U.S. Cl. .......................... 382/299; 382/233; 382/248
[58] Field of Search ..................................... 382/233, 250, 382/299, 248, 232; 358/433, 432

[56] References Cited

U.S. PATENT DOCUMENTS

| | | | |
|---|---|---|---|
| 4,280,143 | 7/1981 | Judd | 358/433 |
| 5,229,864 | 7/1993 | Moranaga et al. | 358/432 |
| 5,253,075 | 10/1993 | Sugiyama | 358/433 |
| 5,298,990 | 3/1994 | Otaka et al. | 348/420 |
| 5,386,241 | 1/1995 | Park | 348/407 |
| 5,446,498 | 8/1995 | Boon | 348/448 |
| 5,483,358 | 1/1996 | Sugiura et al. | 358/508 |
| 5,512,956 | 4/1996 | Yan | 348/620 |
| 5,526,135 | 6/1996 | Chiba | 358/335 |
| 5,528,740 | 6/1996 | Hill et al. | 395/128 |
| 5,566,003 | 10/1996 | Hara et al. | 358/448 |
| 5,566,284 | 10/1996 | Wakayama | 395/130 |

FOREIGN PATENT DOCUMENTS

| | | |
|---|---|---|
| 4229382 | 8/1992 | Japan . |
| 4333989 | 11/1992 | Japan . |

*Primary Examiner*—Yon J. Couso
*Attorney, Agent, or Firm*—Fitzpatrick Cella Harper & Scinto

[57] ABSTRACT

An image processing system has a first apparatus and a second apparatus the resolutions of which differ from each Other. The first apparatus includes an input unit for inputting image data, a smoothing unit for smoothing the image data and a coding unit for coding the image data outputted by the smoothing unit. The second apparatus includes a decoding unit for decoding the encoded image data outputted by the encoding unit, a converting unit for converting resolution of the image data outputted by the decoding unit, and a correcting unit for correcting processing which the smoothing unit applies to the image data outputted by the converting unit. An image processing apparatus for processing image data coded and transmitted to the apparatus after being smoothed includes a decoding unit for decoding the coded image data, a converting unit for converting resolution of the image data outputted by the decoding unit, and a correcting unit for correcting processing which the smoothing unit applies to the image data outputted by the converting unit.

35 Claims, 9 Drawing Sheets

FIG. 8

| 1 | 1 | 1 |
|---|---|---|
| 1 | 1 | 1 |
| 1 | 1 | 1 |

FIG. 9

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

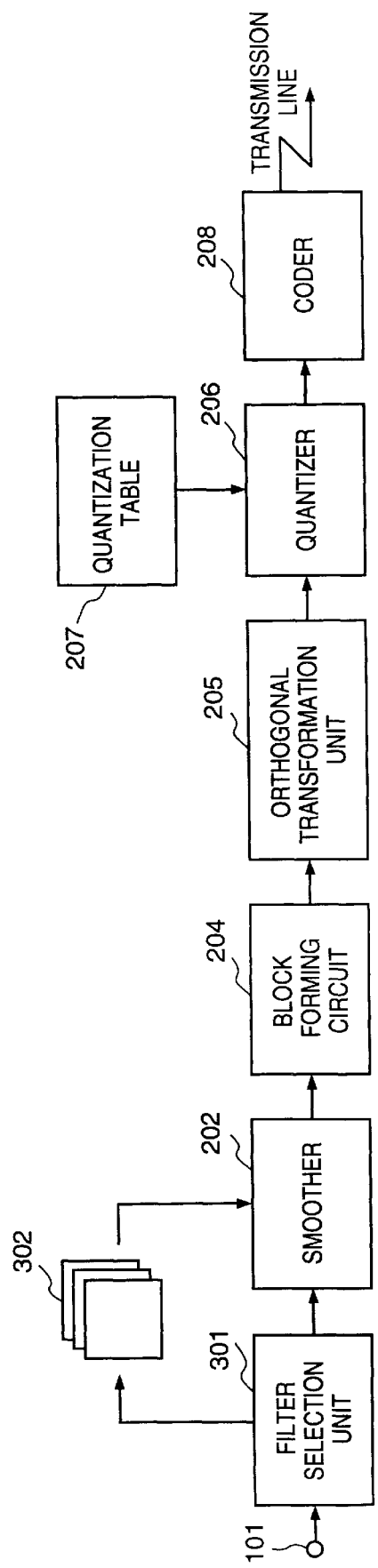

FIG. 12A

| 1 | 0 | 0 |
|---|---|---|
| 0 | 1 | 0 |
| 0 | 0 | 1 |

FIG. 12B

| 0 | 1 | 0 |
|---|---|---|
| 0 | 1 | 0 |
| 0 | 1 | 0 |

FIG. 12C

| 0 | 1 | 1 |
|---|---|---|
| 0 | 1 | 1 |
| 0 | 0 | 0 |

FIG. 12D

| 0 | 1 | 0 |
|---|---|---|
| 0 | 1 | 0 |
| 1 | 1 | 1 |

FIG. 13

| 1 | 1 | 1 |
|---|---|---|
| 1 | 8 | 1 |
| 1 | 1 | 1 |

IMAGE DATA RESOLUTION CONVERSION

BACKGROUND OF THE INVENTION

1. Field of the Invention

This invention relates to an image processing system and an image processing apparatus. More particularly, the invention relates to an image processing system and an image processing apparatus such as an image processing apparatus for performing communication between devices having different resolutions, and a printer or copier which outputs an image at a resolution different for enlargement and reduction and different from that of input resolution.

2. Description of the Related Art

Compression techniques are used in the communication of image information between devices. This is natural when one considers the quantity of information possessed by an image, and the communication of image information without compression is not conceivable at the present time.

There is a JPEG (Joint Photographic Experts Group) standard and a JBIG (Joint Bi-Level Image Experts Group) standard according to which still-picture information is coded. Though the details will not be given here, coding according to the JPEG scheme includes an orthogonal transformation based upon DCT (discrete cosine transformation) and entropy coding of coefficients obtained by quantizing the transformation coefficients. Coding according to the JBIG scheme involves a reduction method which takes into account the communication between devices having different resolutions, as well as entropy coding using arithmetic coding.

Techniques for converting resolution have long been the object of research. Such techniques are required in a case where the sizes of images are made to agree at transmission and reception when devices having different resolutions communicate with each other and in a case where an image is enlarged or reduced in size with resolution being kept the same. Various methods of converting resolution have been proposed. The method of conversion processing in these methods differs depending upon the type of image to be processed (e.g., a multivalued image having grayscale information for every pixel, a binary image binarized to pseudo-halftones, a binary image binarized simply by a fixed threshold value, a character image, etc.).

When an image is enlarged, it is necessary to interpolate a pixel having a new resolution between pixels of low resolution. To accomplish this, generally use is made of zero-order interpolation of the kind shown in FIG. 1, which arrays identical pixel values that are nearest to an interpolated point, and linear interpolation, in which a pixel value E is decided by performing the following operation based upon the distance to four points surrounding an interpolated point (where it is assumed that the pixel values of the four points are A, B, C, D), as shown in FIG. 2:

$$E=(1-i)(1-j)A+i(1-j)B+(1-i)jC+ijD$$

where the position of the pixel E is at distances i, j (i<1, j<1) from A in the horizontal and vertical directions, respectively, in a case where 1 is the distance between pixels.

Further, a method based upon sampling theory utilizing an interpolation function (a SINC function) is not used that much at present owing to the complexity of the hardware.

The communication between devices having different resolutions will be described with reference to FIG. 3. In a case where image information is transmitted between devices, the transmitting side transmits image information upon compressing and coding the information to reduce redundancy in the image. This takes place in a compression unit 1001. The receiving side decodes and decompresses the received code by using a decompression unit 1002 and then obtains an image upon effecting a conversion to the resolution on the receiving side using a resolution converter 1003. With the exception of compression or transmission applied to a binary image according to the JBIG scheme, the transmission of a multiple-tone image generally is performed in the manner shown in FIG. 3. In a case where image information is created in a host computer and outputted to a printer, an image made to conform to the resolution of the printer is created by the host computer using a resolution converter 1004, the image is compressed by a compression unit 1005 and is then transmitted. Upon receiving the image, the printer decompresses it using a decompression unit 1006 and outputs the decompressed image.

In a case where the image compressed includes a multiple-tone natural image and a two-tone character or line drawing mixed in a single image, the simplest compression method would be to quantize orthogonal transformation coefficients using a predetermined quantization table after the orthogonal transformation is performed, as in the JPEG base-line system. If priority is to be given to image quality, the method used would be to change over the quantization conditions adaptively depending upon the local properties. For example, with regard to a character or line drawing, the spatial frequency components contain many high-frequency components and therefore control would be performed to establish quantization conditions according to which coarse quantization is not executed in the high-frequency region.

A scheme of the kind shown in FIG. 5 has also been proposed. Here the transmitting side first reduces high-frequency components in the image by a pre-filter 1010, executes an orthogonal transformation in an orthogonal transformation unit 1011 and transmits the image upon quantizing it in a quantizer 1012. The receiving side performs a reverse quantization in a reverse quantizer 1013, applies an inverse orthogonal transformation in an inverse orthogonal transformation unit 1014 and then decodes the image upon applying processing such as edge emphasis using a post-filter 1015. A hybrid method has also been proposed, according to which a natural image portion and character or line-drawing portion are separated from an image. The natural image is irreversibly compressed utilizing an orthogonal transformation and quantization, and the character or line drawing is reversibly compressed by run-length coding or MMR. In a case where image information is communicated between devices having different resolutions using these methods, an image made to conform to the resolution on the receiving side is obtained by subjecting the image information to zero-order interpolation or linear interpolation on the receiving side or transmitting side.

However, the following problems arise in the examples of the prior art mentioned above:

When quantization is performed under the same conditions irrespective of the characteristics of the image using the JPEG base-line system, a large quantization error in the high-frequency region at the character or line-drawing portion is produced and ringing noise referred to as "mosquito noise" becomes visible.

Further, with the method of changing over quantization conditions, the compression efficiency of characters of line drawings deteriorates markedly and the total sum of amount of code fluctuated widely depending upon the proportion of the character or line drawing.

When the method using the pre-filter and post-filter and the resolution transformation method shown in FIG. 3 are combined, the conversion of resolution is carried out after post-filtering. As a consequence, noise is increased and a deterioration in quality tends to be sensed visually. When the same filters are combined with the form of resolution conversion shown in FIG. 4, the amount of information prior to compression becomes very large when the resolution of a printer, for example, is high, and the range covered by the effects of filtering becomes relatively narrow.

The hybrid method must use different compression schemes for natural image portions and character or line-drawing portions. This leads to higher costs and an increase in hardware.

Furthermore, a problem is encountered in the resolution conversion itself. Specifically, though the method illustrated in FIG. 1 is advantageous in terms of its simple configuration, pixel values are decided for every block enlarged in a case where the method is applied to natural image. As a result, the blocks become conspicuous. In a case where the method is applied to a character, line drawing or computer graphics, the same pixel values are rendered continuous for each block enlarged. The result is an image of conspicuous roughness or "jaggies", especially along diagonal lines. On the other hand, the method of FIG. 2 is used generally to enlarge a natural image. Though the resulting image has an averaged and smoothed image quality, the occurrence of jaggies in characters or line drawings is unavoidable and the edges of images become blurred.

SUMMARY OF THE INVENTION

Accordingly, an object of the present invention is to provide an image processing system and an image processing apparatus in which characters or line drawings can be coded efficiently with little decline in image quality and resolution can be converted without the occurrence of jaggies.

According to a preferred embodiment of the present invention, the foregoing object is attained by providing an image processing system having a first apparatus and a second apparatus of different resolutions, wherein the first apparatus includes input means for inputting image data, smoothing means for smoothing the image data and coding means for coding the image data outputted by the smoothing means, and the second apparatus includes decoding means for decoding the encoded image data outputted by the encoding means, converting means for converting resolution of the image data outputted by the decoding means, and correcting means for correcting processing which the smoothing means applies to the image data outputted by the converting means.

According to another preferred embodiment of the present invention, the foregoing object is attained by providing an image processing system having a first apparatus and a second apparatus of different resolutions, wherein the first apparatus includes input means for inputting digital image data, smoothing means for smoothing the digital image data and coding means for coding the digital image data, which has been outputted by the smoothing means, per pixel block of a first size, and the second apparatus includes decoding means for decoding the coded digital image data, which has been outputted by the coding means, and correcting means for correcting processing which the smoothing means applies to the digital image data outputted by the decoding means.

According to another preferred embodiment of the present invention, the foregoing object is attained by providing an image processing apparatus comprising input means for inputting image data, smoothing means for smoothing the image data, coding means for coding the image data outputted by the smoothing means, memory means for storing the coded data outputted by the coding means, decoding means for decoding the coded data stored in the memory means, converting means for converting resolution of the image data outputted by the decoding means, and correcting means for correcting processing which the smoothing means applies to the image data outputted by the converting means.

According to another preferred embodiment of the present invention, the foregoing object is attained by providing an image processing apparatus for processing image data coded and transmitted to the apparatus after being smoothed, comprising decoding means for decoding the coded image data, converting means for converting resolution of the image data outputted by the decoding means, and correcting means for correcting processing which the smoothing means applies to the image data outputted by the converting means.

According to another preferred embodiment of the present invention, the foregoing object is attained by providing an image processing apparatus for processing digital image data coded, by orthogonal transformation per pixel block of a first size, and transmitted to the apparatus after being smoothed, comprising decoding means for decoding the coded digital image data, and correcting means for correcting processing which the smoothing means applies to the digital image data outputted by the decoding means, wherein the decoding means has transforming means for performing an inverse orthogonal transformation per pixel block of a second size different from the first size.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing a smoothing filter;

FIG. 9 is a diagram showing an example of a quantization table for a natural image;

FIG. 11 is a block diagram showing the construction of a transmitting side according to a second embodiment of the present invention;

FIGS. 12A~12D are diagrams showing typical patterns in which problems tend to occur with the filter shown in FIG. 3;

FIG. 13 is a diagram showing an example of a filter selected in a case where patterns of the kind depicted in FIGS. 12A~12D are detected;

DESCRIPTION OF THE PREFERRED EMBODIMENTS

A image processing apparatus according to an embodiment of the present invention will now be described in detail with reference to the accompanying drawings.

This embodiment assumes that the present invention is applied to a facsimile machine or to an environment in which various input/output devices such as a printer, an image scanner, a video device and an electronic image-sensing camera are interconnected by a network the nucleus of which is a host computer. In a case where these devices exchange image signals with one another in dependence upon the resolutions of the devices themselves, there are many instances in which dependence is placed upon the output resolution of the device on the side transmitting the image. According to this embodiment, however, the image signals between devices, particularly information regarding characters or line drawings, are communicated in a so-called resolution-free state, namely a state in which communication is independent of resolution, just as in the case of a natural image or picture. In order to simplify the description, it will be assumed below that image information that has been created by a host computer is transmitted to a printer. However, the invention is not limited to such an arrangement.

It is usually easy for a host computer to create image information that conforms to the resolution of the printer that outputs the image. For example, assume that an image scanner having a reading resolution of 200 dpi and a printer having an output resolution of 300 dpi have been connected to a host computer. In order to create 300 dpi image information with this arrangement, it will suffice if the input 200 dpi image information is converted to image information corresponding to 300 dpi by linear interpolation. In a case where an image is created in a host computer, it has recently become easy to combine characters or line drawings, which have been created using PDL (page description language) with a natural image entered from an image scanner or the like, and to set up an arrangement for this purpose. In such case it will suffice if font information that has been stored as vector information is combined upon being developed to a resolution of 300 dpi.

The recent progress that has been made in networks makes it easy for a plurality of host computers to share a plurality of printers so that a host computer and a printer need no longer be connected in a one-to-one relationship. Accordingly, a case is conceivable in which an image may be outputted using any one of a plurality of printers having different resolutions. This embodiment takes such a case into consideration and assumes that 300 dpi information created by the foregoing procedure is outputted by a printer having a different resolution of, say, 600 dpi.

Figure 6:
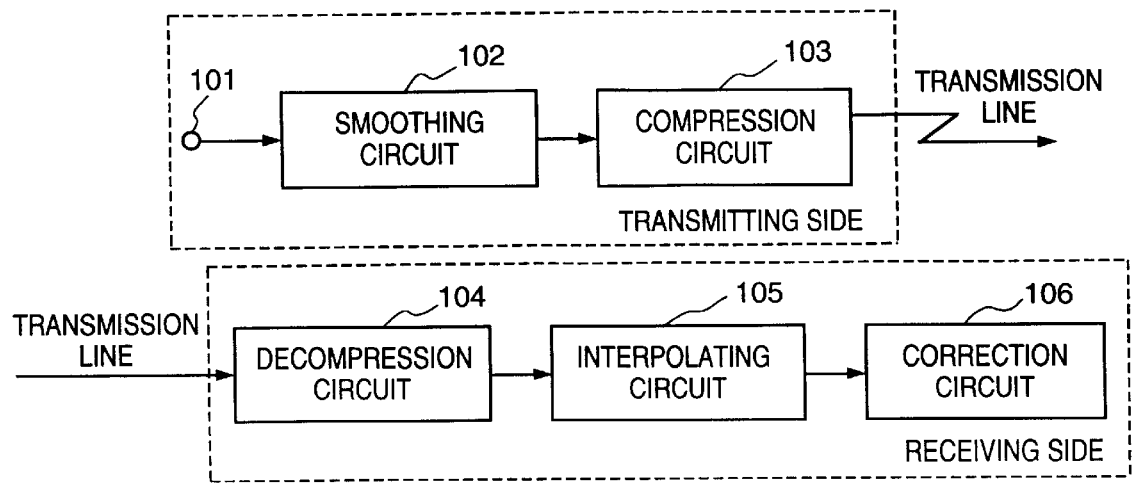
FIG. 6 is a diagram showing the basic construction of an image processing system according to an embodiment of the present invention.

FIG. 6 is a block diagram showing the basic construction of an image processing system according to an embodiment of the present invention. FIG. 6 will be used to describe a procedure through which 300 dpi image information is transmitted to a 600 dpi printer. For the sake of simplicity, the focus of the description will be the processing of binary information (a character or line-drawing portion) contained in an image.

As shown in FIG. 6, 300 dpi image information created in a host computer enters an input terminal 101. As mentioned above, the image information has been spatially separated into a multivalued natural-image area and a binary character or line-drawing area in one page of the image. A smoothing circuit 102 applies spatial filtering processing to the image information that has entered from the terminal 101. A compression circuit 103 reduces the redundancy of the smoothed image information and codes the information to reduce the amount of information transmitted. The code outputted by the compression circuit 103 is transmitted to a transmission line.

The printer on the receiving side receives the code via an input/output unit, which is not shown. A decompression circuit 104 decodes and decompresses the entered code to restore the image information. An interpolating circuit 105 interpolates the decompressed image information to a resolution conforming to the printer. This may be linear interpolation or higher-order interpolation, although zero-order interpolation is not possible. A correcting circuit 106 subjects the interpolated image information to a correction conforming to the smoothing processing that was applied on the transmitting side.

Figure 7:
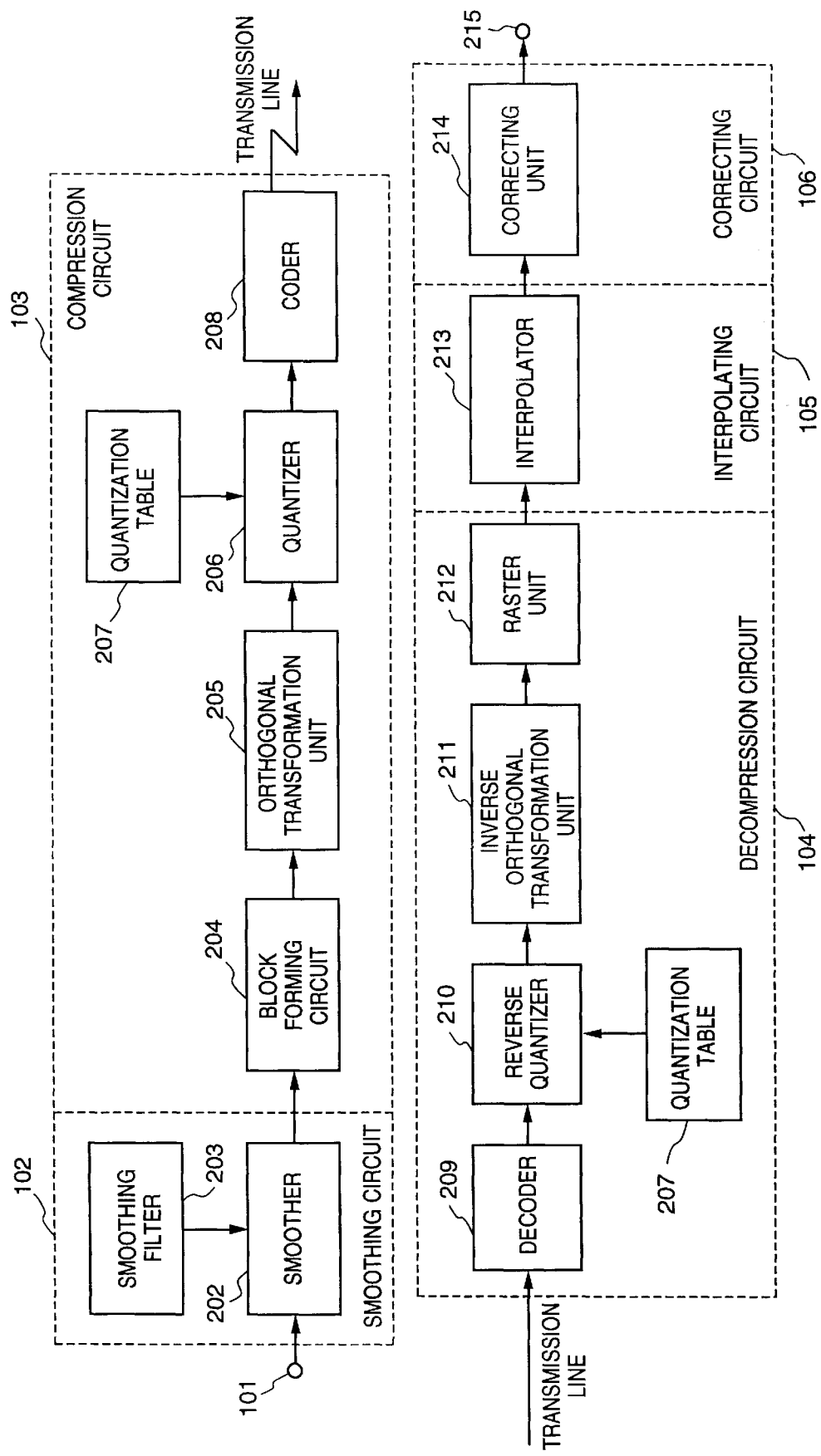
FIG. 7 is a block diagram showing the details of construction of this embodiment.

FIG. 7 is a block diagram showing the detailed construction of this embodiment.

As shown in FIG. 7, the binary character or line-drawing area entered from the input terminal 101 is applied to the smoothing circuit 102, where the product sum of the image information is taken by a smoothing unit 202 using a smoothing filter 203 that has already been stored. FIG. 8 is a diagram showing an example of the smoothing filter.

The smoothed image information enters the compression circuit 103, where the image information is formed into blocks per N×N pixels by a block forming unit 204 upon being delayed several lines. The image information formed into blocks undergoes an orthogonal transformation in an orthogonal transformation unit 205. A DCT (discrete cosine transformation) standardized by the JPEG or some other or an orthogonal transformation by some other scheme may be used as the orthogonal transformation in the unit 205. The transformation coefficients obtained by the orthogonal transformation is subjected to scalar quantization by a quantizer 206. It should be noted that the quantization coefficients corresponding to each of the frequency components have already been stored in a quantization table 207.

Since the degree of correlation between neighboring pixels is intrisically high in a natural image, the transformation coefficients concentrate in the low-frequency region when an orthogonal transformation is applied. By utilizing this property, the quantization steps are narrowed in the low-frequency region. Conversely, in view of the fact that not many transformation coefficients occur in the high-frequency region and that quantization error in the high-frequency region is not visually conspicuous, the quantization steps in the high-frequency region are widened and forcible quantization to "0" may be performed. FIG. 9 is a diagram illustrating an example of a quantization table for a natural image. The values shown in the table corresponding to quantization steps of each of the frequency components.

On the other hand, an artificially created image such as a character or line drawing has may edges, unlike a natural image, and many transformation coefficients occur in the high-frequency region. Consequently, when a quantization table the same as that for a natural image is used, ringing or so-called mosquito noise is produced by coarse quantization in the high-frequency region. If the quantization steps are narrowed down to the high-frequency region, however, coding efficiency declines.

In this embodiment, smoothing processing is applied to characters or line drawings, as mentioned above, and therefore not that many transformation coefficients are produced in the high-frequency region. Accordingly, even if the high-frequency region is quantized coarsely using a quantization table identical with that for a natural image, mosquito noise does not readily occur and coding efficiency is excellent.

A coder 208 codes the quantization coefficients. Here the quantization coefficients may be coded as they are. An alternative effective method is to divide the quantization coefficients into "0" and other significant coefficients and perform entropy encoding with the "0" run length and group numbers of significant coefficients. The smoothed, coded 300 dpi character or line-drawing information is transmitted to the printer side via a transmission line.

A decoder 209 decodes the code received from the transmission line. A reverse quantizer 210 subjects the output of the decoder 209 to reverse quantization. The reverse quantization is executed based upon a quantization table 207 the same as that used at the time of quantization. Accordingly, the quantization table may be decided between the printer and the host in advance or the table can be transmitted along with the image information. An inverse orthogonal transformation unit 211 applies an inverse orthogonal transformation to the information that has undergone reverse quantization. A raster unit 212 forms a raster of the image information, which has been formed into blocks, obtained by the inverse orthogonal transformation.

An interpolator 213 applies interpolation to, say, a 300 dpi image, which has been outputted by the raster unit 212, to convert the image to a 600 dpi image. The method of interpolation preferably is linear interpolation in view of ease of processing and image quality, but the method is not limited to this and may be interpolation of higher order. A correcting unit 214 applies the interpolated 600 dpi image to processing for edge emphasis. More specifically, this is processing to emphasize the edges of the image blurred by the smoothing applied on the transmitting side. By way of example, a method of binarizing an image is available as the correction method. This involves taking the average value (A+B)/2 of two values A and B (A>B) as a threshold value, substituting A for a pixel of the interpolated image that is equal to or greater than the threshold value and substituting B for pixels that are less than the threshold value. These two values can be included in the header of the image information transmitted from the host computer or they can be coded and transmitted as additional information in individual image units. Further, the two values may be estimated from the image data in block or greater units on the printer side. However, in case of a printer which forms an image using binary values, it goes without saying that these two values will be transmitted.

The image information thus obtained is outputted to a printer engine or the like via an output terminal 215.

The manner in which the image information is changed by the foregoing processing operations will now be described.

FIGS. 10A–10E are diagrams showing the manner in which the same edge portion of a character or line drawing is changed by the foregoing processing.

Figure 10A:
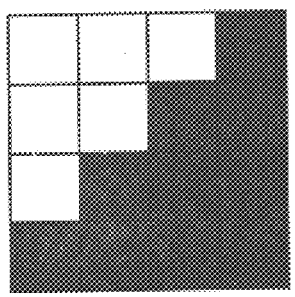
FIGS. 10A~10E are diagrams showing the manner in which the same edge portion of a character or line drawing is changed by processing.
Figure 10B:
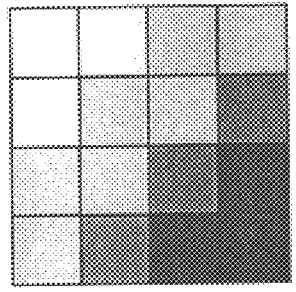
Figure 10C:
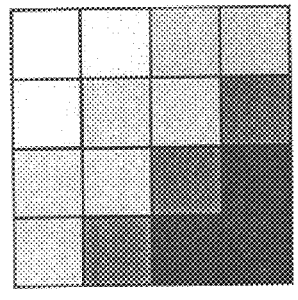
Figure 10D:
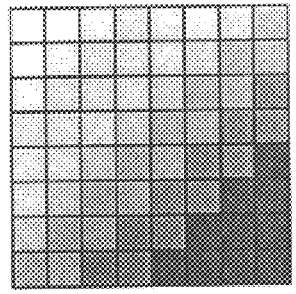
Figure 10E:
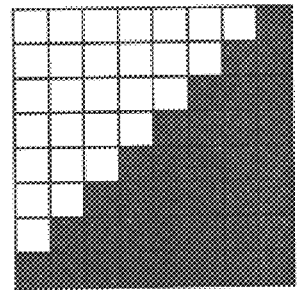

FIG. 10A shows an example of an input to the smoothing unit 202, and FIG. 10B illustrates an example of an output from the block forming unit 204, namely the data obtained by smoothing and block formation. (For the sake of simplicity, the orthogonal transformation will be performed in units of 4×4 pixels.) It will be appreciated from FIGS. 10A and 10B that an edge portion is rendered indistinct and blurred by smoothing. FIG. 10C illustrates an example of the output from the inverse orthogonal transformation unit 211. This shows the information of the same block after the inverse orthogonal transformation on the receiving side. As mentioned above, the state of FIG. 10B is established by application of smoothing before the orthogonal transformation, and therefore the coding efficiency is excellent, the quantization error is small and naturally there is no mosquito noise. FIG. 10D illustrates an example of the output from the interpolator 213 and shows an edge portion in which resolution has been doubled by linear interpolation. The number of pixels is doubled in both the vertical and horizontal directions and the information of the 4×4 pixels becomes information of 8×8 pixels. FIG. 10E illustrates an example of the output from the correcting unit 214. This shows the result of binarizing the image of FIG. 10. Thus, the edge of a character or line drawing does not develop jaggies, coding efficiency is good and an excellent conversion of resolution can be achieved.

In the compression and coding of characters or line drawings, investigations have been made with regard to achieving this as reversibly (losslessly) as possible and with regard to performing compression efficiently as possible while achieving reversibility. For example, in compression of an image in which characters or line drawings are mixed, the hybrid method has been proposed in which, as described earlier, the image is separated into the character or line-drawing portion and the natural image portion and these portions are compressed individually. With regard to a natural image, this method is capable of utilizing the correlativity of the natural image and employs irreversible compression because a deterioration in the image quality is difficult to perceive visually. With regard to characters or line drawings, the method often employs reversible compression such as MMR owing to the importance of the character or line-drawing information.

However, in compression applied to devices between which there is a difference in resolution, it will suffice if a character or line drawing free of conspicuous jaggies is obtained in the final results. That is, the original image on the transmitting side is an image dependent upon the resolution on the transmitting side, and the edges of characters or line drawings dependent upon this resolution need not be reversibly compressed before they are transmitted. Even if transmission is performed following reversible compression, the resolution of the received image is changed on the receiving side in order to make the information conform to the resolutions of the receiving side itself. In other words, the information is changed on the receiving side. This makes the reversible compression on the transmitting side meaningless. If a change is not applied to the information, this will mean performing zero-order interpolation and an image having conspicuous jaggies will be the result. In other words, in a character or line drawing, not all of the information is important. So long as the important portion of the character or line image can be transmitted, it will be possible to apply any subsequent processing to this portion of the image. Irreversible compression can be applied in the case of a character or line drawing as well.

More specifically, the present embodiment takes into account the characteristics for a case where an image is transmitted between devices having different resolutions. On the transmitting side, the edges of characters or line drawings are blunted, thereby excluding frequency components (high-frequency components) depending upon the original resolution, after which resolution is converted. On the receiving side, edges (high-frequency components) conforming to the new resolution are formed. As a consequence, a desirable state is attained in which the character or line-drawing information on a transmission line is not dependent upon resolution, and the coding efficiency can be improved. Furthermore, if characters or line drawings are thus compressed, circuitry which is almost the same as the compression circuitry for a natural image can be shared.

[Second Embodiment]

An image processing apparatus according to a second embodiment of the present invention will now be described. Elements in the second embodiment similar to those of the first embodiment are designated by like reference characters and need not be described in detail again.

FIG. 11 is a block diagram showing the construction of the transmitting side in a second embodiment of the invention.

On the basis of the local properties of the input image, a filter selecting unit 301 selects a smoothing filter, which conforms to these properties, from a filter group 302 and sets the selected smoothing filter in the smoothing unit 202. For example, when a portion containing a plurality of edges is processed by the smoothing filter shown in FIG. 8, problems which arise are that the edges become lumped together and that slender lines become discontinuous and vanish. Accordingly, by selecting a filter in conformity with the pattern of a window of L×M pixels (3×3 pixels in FIG. 3) when an input image is filtered, the occurrence of these problems is prevented.

The filter selecting unit 301 makes the selection by a look-up table (hereinafter referred to as a "LUT"), by way of example. For instance, if there is a character or line-drawing area comprising the two values A and B and "0", "1" are correlated with the pixels of values A and B, respectively, in the 3×3 window, then nine-bit window pattern information is obtained. A pattern in which difficulties are produced by smoothing is then obtained experimentally and data of a type which will select a filter that will make up for these difficulties when the pattern is detected is registered in the LUT in advance.

Figure 1:
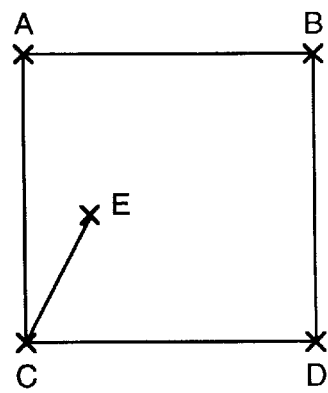
FIG. 1 is a diagram for describing zero-order interpolation.
Figure 2:
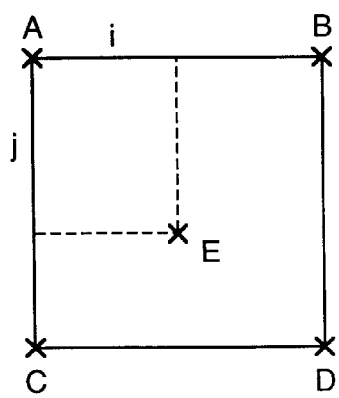
FIG. 2 is a diagram for describing linear interpolation.
Figure 3:
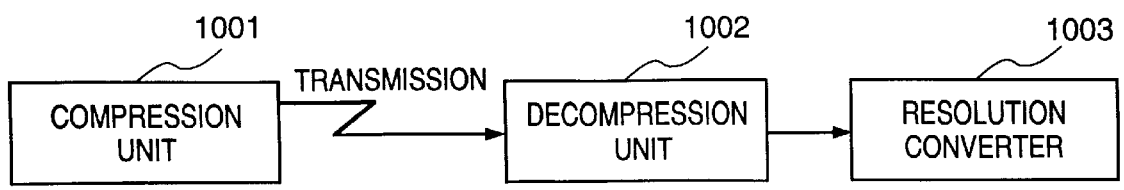
FIG. 3 is a diagram for describing communication between devices having different resolutions.
Figure 4:
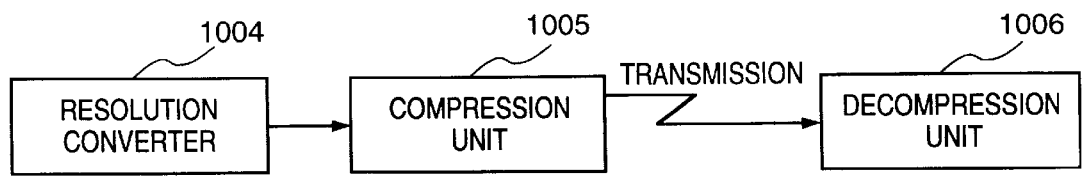
FIG. 4 is a diagram for describing communication between devices having different resolutions.
Figure 5:
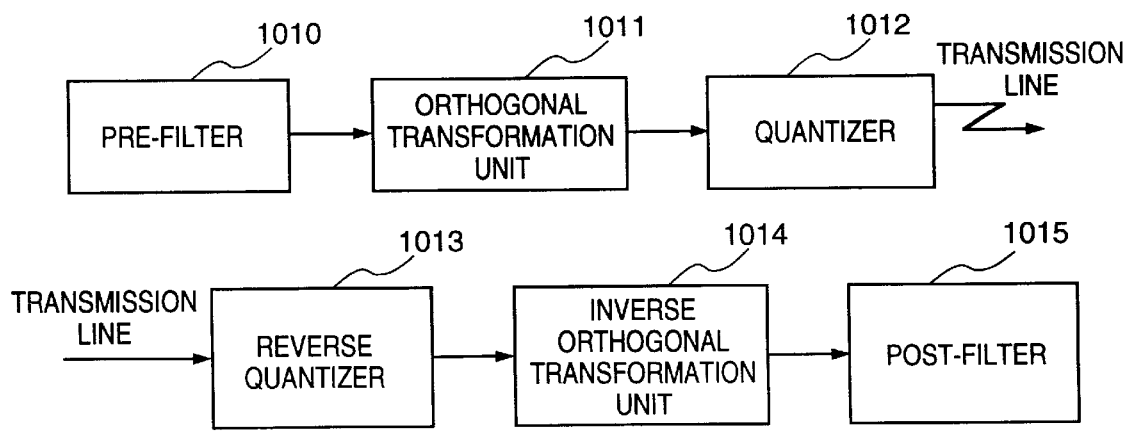
FIG. 5 is a diagram for describing communication between devices having different resolutions.

FIGS. 12A~12D are diagrams showing typical patterns in which difficulties tend to arise with use of the filter shown in FIG. 3. FIGS. 12A and 12B are patterns of fine lines. There is a possibility that these fine lines may be cut by smoothing. FIGS. 12C and 12D are patterns corresponding to the corner of a figure. There is a possibility that such a corner will be rounded by smoothing. In a case where patterns of the kind shown in FIGS. 12A through 12D are detected, the filter selecting unit 301 selects a filter weighted for the pixel of interest, as exemplified in FIG. 13, or the smoothing unit is set in such a manner that filtering processing will not be applied.

Thus, in accordance with this embodiment, various patterns are set in the LUT of the filter selecting unit 301 beforehand, and the corresponding filters are registered in the filter group 302. As a result, a filter can be selected adaptively to prevent the above-mentioned difficulties and portions that may develop jaggies can be processed appropriately.

Furthermore, with regard to switching among filters, which filter should be used for a particular portion of an image need not be taken into consideration. As long as an area can be identified as being a character or line-drawing area comprising the two values of A and B, the correcting unit on the receiving side will binarize the image using (A+B)/2, for example, as the threshold value, whereby a character or line drawing having a new resolution can be formed without the occurrence of jaggies. As a result, it is not necessary to transmit filter information from the transmitting side.

Further, the invention is not limited to changeover of filters based upon a binary pattern within a window. For example, it is possible to switch among filters by an arithmetic operation using, as an evaluation function, the complexity of an edge neighboring the pixel of interest.

Further, the filter selection can be made not only with regard to a binary area such as a character or line-drawing area. An arrangement can be adopted in which the overall image is subjected to adaptive processing, the image is separated into a natural image area and a character or line-drawing area and which filter should be applied to the character or line-drawing area is selected based upon the local properties of the image (e.g., the number of gray levels of peripheral pixels, whether or not an edge is identified, etc.).

[Third Embodiment]

An image processing apparatus according to third embodiment of the invention will now be described. Elements in the third embodiment similar to those of the first embodiment are designated by like reference characters and need not be described in detail again.

Figure 14:
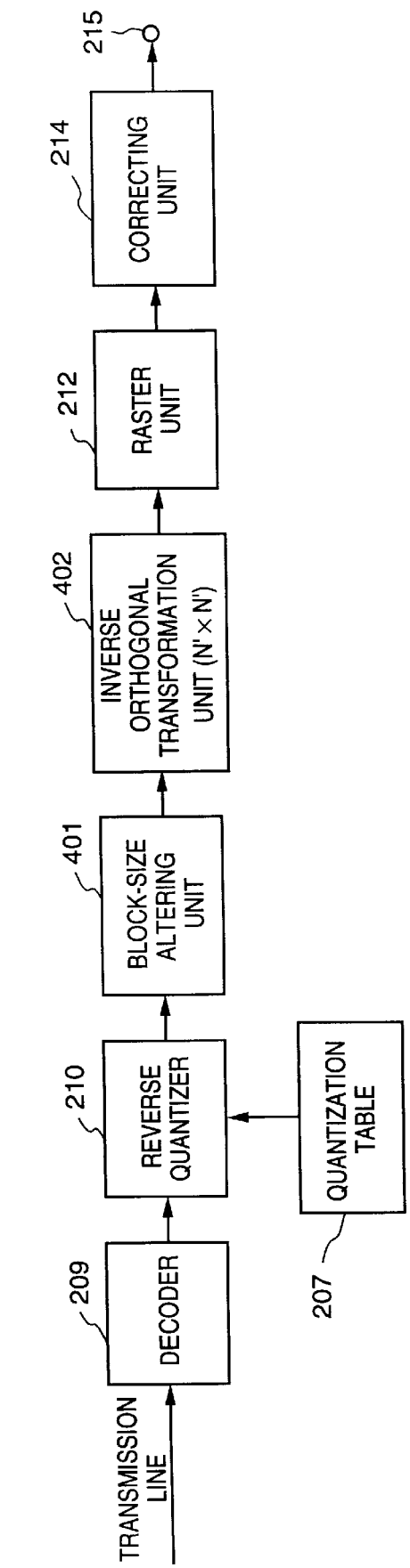
FIG. 14 is a block diagram showing the construction of a receiving side according to a third embodiment of the present invention.

FIG. 14 is a block diagram showing the construction of the receiving side in a third embodiment of the invention. According to this embodiment, compressed information is decompressed and the resolution thereof is converted in communication between devices having different resolutions. More specifically, a resolution conversion is applied to information formed into blocks after reverse quantization.

An example of a method of combining DCT and resolution conversion is a method of substituting zero for high-frequency components at the time of size enlargement after DCT, changing block size by dropping high-frequency components at the time of size reduction, and then applying IDCT. (For example, see Murayama: "Technique for High-Resolution Conversion of Document Images", *Gazo Denshi Gakkai*, Vol. 22, No. 2, pp. 129~132, 1993, and the specifications of Japanese Patent Application Laid-Open Nos. 4-229382 and 4-333989.) The transformation coefficients of two-dimensional DCT of N×N pixels are obtained by the following equation:

$$F(u, v) = (2/N)C(u)C(v) \times \sum_{m=0}^{N-1}\sum_{n=0}^{N-1} f(m, n)\cos\{(2m + 1)u\pi/2N\}\cos\{(2n + 1)v\pi/2N\} \quad (1)$$

where the function C(p) is $1/\sqrt{2}$ when p=0 holds and 1 when p≠1 holds.

The IDCT is obtained by the following equation:

$$f(m, n) = (2/N) \times \sum_{m=0}^{N-1}\sum_{n=0}^{N-1} C(u)C(v)F(u, v)\cos\{(2m + 1)u\pi/2N\}\cos\{(2n + 1)v\pi/2N\} \quad (2)$$

The relationship between the matrix [F(u,v)] of (N×N)-number of F(u,v) and an extension matrix [[F(u,v)]] in which zero is substituted for the high-frequency components is as follows (where the DC component is shown at the upper left):

$$[[F(u, v)]] = \begin{bmatrix} [F(u, v)] & 0 \\ 0 & 0 \end{bmatrix} \quad (3)$$

This method makes it possible to perform a resolution conversion exhibiting good image quality at the same time that decompression is carried out.

A case will now be described in which, when a 300 dpi character is converted to a resolution of 600 dpi, an orthogonal transformation is applied in blocks of the 4×4 pixels and an inverse orthogonal transformation is performed in blocks of 8×8 pixels (in which zero is substituted for the high-frequency components). When an artificially created character or line drawing is orthogonally transformed, a large amount of electric power is present in the high-frequency region of the 4×4 pixel block. No matter how finely the high-frequency region is quantized on the compression side, an error develops in the basic vector of each sequence number of the 4×4 pixels and the 8×8 pixels when enlargement is made to 8×8 pixels, zero is substituted into the high-frequency region and an inverse orthogonal transformation is applied. Further, by substituting zero into the high-frequency region, ringing-type mosquito noise is produced in the 8×8 pixel block in the same manner as when the high-frequency region is cut. In other words, in order to use the method described above, the edges of characters or line drawings must be destroyed and it must be so arranged that a large amount of power is not generated in the high-frequency region in the original 4×4 pixel block. The transmitting side in this embodiment is so adapted that characters or line drawings are subjected to a smoothing filter and orthogonally transformed in the same manner is in the above-described embodiment. As a result, the edges of characters or line drawings are destroyed and the power produced in the high-frequency region of the 4×4 pixel block is reduced.

In FIG. 14, numeral 401 denotes a block-size altering unit which performs the operation indicated by Equation (3). More specifically, the information of the reverse-quantized 4×4 pixel block is placed in the low-frequency region and zero is substituted into the remaining high-frequency region to create the block of 8×8 pixels. Numeral 402 denotes an inverse orthogonal transformation unit for executing an inverse orthogonal transformation of N'×N' (e.g., N'=8).

Since the image is processed to one having little power in the high-frequency region at the time of the 4×4 pixel block, mosquito noise is not produced. In the 8×8 pixel block, however, the image that has been subjected to the inverse orthogonal transformation is an image in which the edges have been destroyed and blurred. Therefore, after the image of the 8×8 pixel block is changed to a raster image by the raster unit 212, the edges of characters or line drawings are formed by the correcting unit 214 to obtain the final image having a new resolution.

Thus, in accordance with this embodiment, an excellent, effective conversion of resolution can be implemented without interpolation processing.

[Fourth Embodiment]

An image processing apparatus according to a fourth embodiment of the invention will now be described. Elements in the fourth embodiment similar to those of the first embodiment are designated by like reference characters and need not be described in detail again.

An example will be described below in which, in an image output apparatus such as a printer, 300 dpi image information sent from the host computer is outputted upon being converted to 600 dpi image information, which is the resolution of the printer engine.

Figure 15:
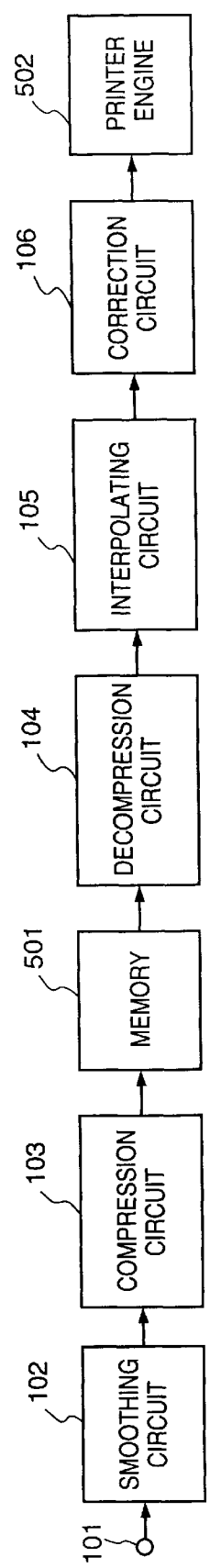
FIG. 15 is a block diagram showing the construction of a fourth embodiment of the present invention.

FIG. 15 is a block diagram showing the construction of the fourth embodiment of the present invention. This is an example in which the transmitting side and receiving side are included in the same apparatus.

Numeral 501 in FIG. 15 denotes a memory which, in order to hold down cost, has a storage capacity smaller than the amount of information necessary for the maximum output area of a printer engine 502. Accordingly, the compression circuit 103 is for the purpose of compressing 300 dpi image information, which has entered from a host computer (not shown), to such an extent that it will fit into the memory 501.

As in the foregoing embodiment, the image information of resolution 300 dpi smoothed by the smoothing circuit 102 is coded efficiently by the compression circuit, after which the coded image is stored in the memory 501. The image is decompressed by the decompression circuit 104 in conformity with the processing speed of the printer engine 502, the resulting image is interpolated to a resolution of 600 dpi by the interpolating circuit 105, and then the correcting circuit 106 applies a correction for the above-described smoothing, whereby an image of 600 dpi resolution having excellent character or line-drawing edges is outputted to the printer engine 502.

Thus, if the transmission line interconnecting the devices of different resolutions in each of the foregoing embodiments is replaced by a memory, the present invention can be applied effectively even to conversion of resolution in an image output apparatus such as a printer in which memory is conserved.

[Fifth Embodiment]

An image processing apparatus according to a fifth embodiment of the invention will now be described. Elements in the fifth embodiment similar to those of the first embodiment are designated by like reference characters and need not be described in detail again.

Each of the foregoing embodiments deals with a binary (two-tone) character or line drawing. This embodiment is adapted for natural images.

Figure 16:
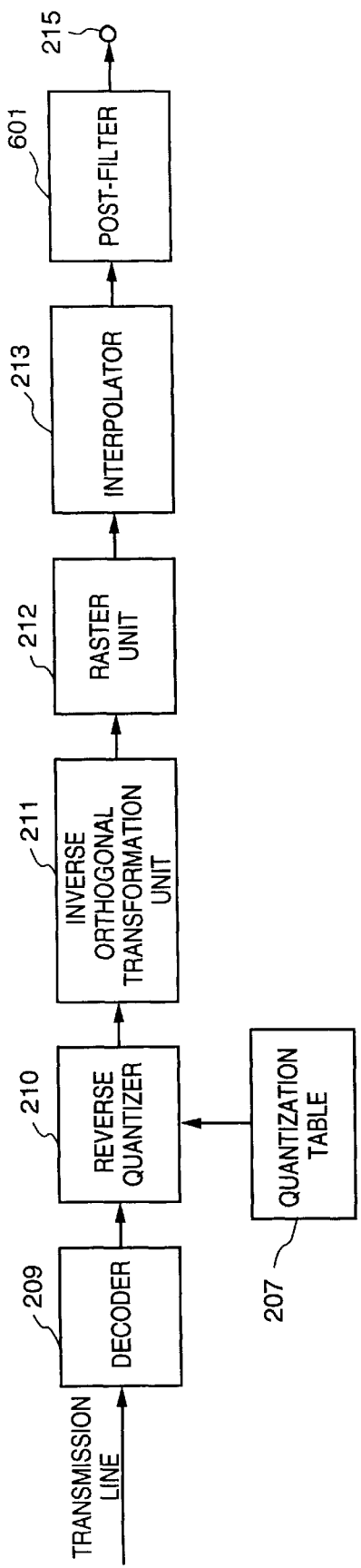
FIG. 16 is a block diagram showing the construction of a receiving side according to a fifth embodiment of the present invention.

FIG. 16 is a block diagram showing the construction of the receiving side according to the fifth embodiment of the invention.

On the transmitting side, a natural image that has been subjected to adaptive smoothing filtering, had its high-frequency components reduced and been coded is decoded by the decoder 209, subjected to reverse quantization by the reverse quantizer 210, subjected to inverse orthogonal transformation by the inverse orthogonal transformation unit 211 rasterized by the raster unit 212 and subjected to interpolation, such as linear interpolation, by the interpolator 213 so as to conform to the resolution of the receiving side. It should be noted that it is permissible for the filtering processing of the natural image to increase the weighting of the pixel of interest beyond that which prevailed when the image was a character or line drawing.

Numeral 601 denotes a post-filter for correcting the smoothing processing applied on the transmitting side. Various filters can be employed, such as a quadratic differentiating filter for edge emphasis.

If this arrangement is adopted, communication can be performed with efficient coding and in a form independent of resolution, just as in the embodiments described above.

When resolution dependency based upon the type of input image information is considered, it is seen that edges produced at the time of low resolution are dependent upon the resolution in a character or line drawing created by a host computer or the like, and therefore high-frequency components that are a hindrance to conversion of resolution are contained in the image. This means that it is necessary to create an edge (new high-frequency component information) that conforms to the new resolution. On the contrary, in the case of a half-tone image such as a natural image, a near resolution-free state is attained even at the time of low resolution since it is considered that some LPF (lower-pass filtering) will have been applied at the time of image creation, unlike the case of a character or line drawing created by a host computer or the like. More specifically, since it is considered that a state in which edges have been destroyed will already exist in the state in which the image is entered, there will be few troublesome frequency components and it will suffice to form new edges in a state in which resolution has been raised.

However, an edge portion is a portion that is dependent upon the original resolution, even if the image is a natural image. Consequently, the occurrence of jaggies is unavoidable with resolution conversion based upon ordinary linear interpolation. Accordingly, a steep edge can be formed again at a new resolution by applying smoothing at the original resolution and applying a correction at the new resolution, as in the manner of this embodiment.

Further, an effective expedient is to combine this embodiment with the embodiment of FIG. 7 and switch adaptively between the filter on the transmitting side and the correcting unit on the receiving side. If the filter and the correcting unit on the transmitting and receiving sides are made to conform, the content of the filter used on the transmitting side or a number indicating the content of the filter may be coded and transmitted. A more effective manner of use is possible by switching between the smoothing filter and the correcting unit in interlocking fashion.

It should be noted that the present invention can be practiced in various ways without departing from spirit and principal features thereof. For example, in the foregoing embodiments, an image processing method has been described in which coding is performed efficiently and an excellent image quality obtained by performing compression and resolution conversion in combination. However, the processing performed by the correcting unit is not limited to binarization processing or post-filtering, for the correcting unit may also execute n-value conversion processing in a case where the character or line drawing has n values (n-number of gray levels, where n>2). In case of such n-value conversion, the coding and transmission of n-value information or threshold-value information may be contemplated if necessary and an arrangement can be adopted in which these items of information are inferred on the receiving side.

Further, the smoothing filter may be a filter other than that illustrated in FIG. 3. In the foregoing embodiments, an example is described in which the receiving side performs interpolation or correction after the formation of the raster image. However, interpolation or correction may be implemented with the pixels in the block state, and interpolation is not limited to linear interpolation.

In the embodiments set forth above, a case is described in which the resolution on the receiving side is high. In a case where the resolution on the receiving side is low, equivalent effects can be obtained by executing pixel-selection processing instead of interpolation. Though it is preferred that mean-value pixel selection be used as the pixel-selection processing, this does not represent a limitation upon the invention. Furthermore, interpolation or pixel-selection processing can be implemented in similar fashion even in a case where magnification in the vertical direction differs from that in the horizontal direction.

The present invention can be applied to a system constituted by a plurality of devices or to an apparatus comprising a single device. Furthermore, it goes without saying that the invention is applicable also to a case where the object of the invention is attained by supplying a program to a system or apparatus.

In other words, the foregoing description of embodiments has been given for illustrative purposes only and is not to be construed as imposing any limitation in every respect.

The scope of the invention is, therefore, to be determined solely by the following claims and is not limited by the text of the specification and alterations made within a scope equivalent to the scope of the claims fall within the true spirit and scope of the invention.

What is claimed is:

1. An image processing system having a first apparatus and a second apparatus, said first apparatus comprising:
    input means for inputting image data;
    smoothing means for smoothing an image represented by the input image data by performing a smoothing process on the input image data; and
    coding means for coding the image data smoothing processed by said smoothing means, and
    said second apparatus comprising:
        decoding means for decoding the image data coded by said coding means;
        converting means for converting a resolution of an image represented by the decoded image data; and
        correcting means for performing an edge-emphasis process to emphasize edges of an image represented by the resolution-converted image data output by said converting means.

2. The system according to claim 1, wherein said smoothing means is a low-pass filter.

3. The system according to claim 1, wherein said smoothing means changes over a smoothing method adaptively depending upon local properties of the image.

4. The system according to claim 3, wherein said correcting means changes over an edge-emphasis method adaptively in conformity with the changeover of the smoothing method of said smoothing means.

5. The system according to claim 1, wherein said coding means codes the image data using an orthogonal transform.

6. The system according to claim 1, wherein said converting means converts resolution by linear interpolation processing or mean-value pixel-selection processing.

7. The system according to claim 1, wherein the edge-emphasis process changes the image data to n values (n≧2) using prescribed threshold values.

8. An image processing system having a first apparatus and a second apparatus having resolutions that differ from each other, said first apparatus comprising:
    input means for inputting digital image data;
    smoothing means for smoothing an image represented by the input digital image data by performing a smoothing process on the input digital image data; and
    coding means for coding the digital image data, which has been smoothing processed by said smoothing means, by using an orthogonal transformation in pixel blocks of a first size, and
    said second apparatus comprising:
        decoding means for converting the pixel blocks of the coded digital image data into a second size different from the first size, and decoding the converted and coded digital image data by using an inverse orthogonal transformation in the pixel blocks of the second size; and correcting means for performing an edge-emphasis process to emphasize edges of an image represented by the decoded digital image data.

9. The system according to claim 8, wherein said smoothing means is a low-pass filter.

10. The system according to claim 8, wherein said smoothing means changes over a smoothing method adaptively depending upon local properties of the image.

11. The system according to claim 10, wherein said correcting means changes over an edge-emphasis method adaptively in conformity with the changeover of the smoothing method of said smoothing means.

12. The system according to claim 8, wherein the edge-emphasis process changes the image data to n values (n≧2) using prescribed threshold values.

13. The system according to claim 8, wherein said coding means includes orthogonal transformation means for performing the orthogonal transformation every block of (n×n) pixels.

14. The system according to claim 13, wherein said decoding means includes inverse orthogonal transformation means for performing the inverse orthogonal transformation every block of (m×m) pixels.

15. An image processing apparatus comprising:

input means for inputting image data;

smoothing means for smoothing an image represented by the input image data by performing a smoothing process on the input image data;

coding means for coding the image data smoothing processed by said smoothing means;

memory means for storing the image data coded by said coding means;

decoding means for decoding the coded image data stored in said memory means;

converting means for converting a resolution of an image represented by the decoded image data; and correcting means for performing an edge-emphasis process to emphasize edges of an image represented by the resolution-converted image data.

16. The system according to claim 15, wherein said smoothing means is a low-pass filter.

17. The apparatus according to claim 15, wherein said smoothing means changes over a smoothing method adaptively depending upon local properties of the image.

18. The apparatus according to claim 17, wherein said correcting means changes over an edge-emphasis method adaptively in conformity with the changeover of the smoothing method of said smoothing means.

19. The apparatus according to claim 15, wherein said coding means codes the image data using an orthogonal transform.

20. The apparatus according to claim 15, wherein said converting means converts resolution by linear interpolation processing or mean-value pixel-selection processing.

21. The system according to claim 15, wherein the edge-emphasis process changes the image data to n values (n≧2) using prescribed threshold values.

22. An image processing apparatus for processing coded image data, coded and transmitted to the apparatus after being subjected to a smoothing process for smoothing an image represented by the image data, said apparatus comprising:

decoding means for decoding the coded image data;

converting means for converting a resolution of an image represented by the decoded image data; and correcting means for performing an edge-emphasis process to emphasize edges of an image represented by the resolution-converted image data.

23. The apparatus according to claim 22, wherein said converting means converts resolution by linear interpolation processing or mean-value pixel-selection processing.

24. The system according to claim 22, wherein the edge-emphasis process changes the image data to n values (n≧2) using prescribed threshold values.

25. An image processing apparatus for processing coded digital image data, coded by using an orthogonal transformation on a unit basis of a pixel block of a first size, and transmitted to the apparatus after being subjected to a smoothing process of smoothing an image represented by the digital image data, said apparatus comprising:

decoding means for converting the pixel block of the coded digital image data into a second size different from the first size, and decoding the converted and coded digital image data by using an inverse orthogonal transformation on a unit basis of the pixel block of the second size; and correcting means for performing an edge-emphasis process to emphasize edges of an image represented by the decoded digital image data.

26. The apparatus according to claim 25, wherein the edge-emphasis process changes the image data to n values (n≧2) using prescribed threshold values.

27. An image processing method for processing coded image data, coded and transmitted after being subjected to a smoothing process for smoothing an image represented by the image data, said method comprising the steps of:

decoding the coded image data;

converting a resolution of an image represented by the decoded image data; and performing an edge-emphasis process to emphasize edges of an image represented by the resolution-converted image data.

28. An image processing method for processing coded digital image data, coded by using an orthogonal transformation on a unit basis of a pixel block of a first size, and transmitted after being subjected to a smoothing process for smoothing an image represented by the digital data, said method comprising the steps of:

converting the pixel block of the coded digital image data into a second size different from the first size;

decoding the converted and coded digital image data by using an inverse orthogonal transformation on the unit basis of the pixel block of the second size; and performing an edge-emphasis process to emphasize edge of an image represented by the decoded digital image data.

29. An image processing system according to claim 1, wherein the edge-emphasis process by said correcting means complements the smoothing process of said smoothing means.

30. An image processing system according to claim 8, wherein the edge-emphasis process by said correcting means complements the smoothing process of said smoothing means.

31. An image processing apparatus according to claim 15, wherein the edge-emphasis process by said correcting means complements the smoothing process of said smoothing means.

32. An image processing apparatus according to claim 22, wherein the edge-emphasis process by said correcting means complements the smoothing process of said smoothing means.

33. An image processing apparatus according to claim 25, wherein the edge-emphasis process by said correcting means complements the smoothing process of said smoothing means.

34. An image processing method according to claim 27, wherein the edge-emphasis process complements the smoothing process.

35. An image processing method according to claim 28, wherein the edge-emphasis process complements the smoothing process.

* * * * *